Patented Dec. 31, 1935

2,026,256

UNITED STATES PATENT OFFICE 2,026,256

ACCELERATOR OF VULCANIZATION

Waldo L. Semon, Silver Lake Village, Ohio, assignor to The B. F. Goodrich Company, New York, N. Y., a corporation of New York No Drawing. Application February 20, 1934, Serial No. 712,173

20 Claims. (Cl. 18—53)

This invention relates to the art of rubber manufacture and has as its chief object to provide a new and improved class of accelerators of vulcanization.

The process of this invention consists in vulcanizing rubber in the presence of tetra-aryl substituted thiuram sulphides. Specifically, rubber may be mixed and heated with a tetra-aryl substituted thiuram monosulphide, disulphide, or even trisulphide or tetrasulphide, and preferably also with sulphur and the usual adjuvants such as zinc oxide and the like, although the sulphur may be omitted if desired in case the disulphide or higher polysulphides are used. The accelerators of this invention include the thiuram sulphides containing four like or unlike aryl substituents; for example, the tetraphenyl, tetratolyl (ortho, meta, para or mixed), tetranaphthyl (alpha or beta), diphenyl-ditolyl, diphenyl-dicumyl, diphenyl di-isopropenylphenyl, diphenyl dixenyl, diphenyl-dinaphthyl, and other like substituted compounds, as well as compounds containing substituted aryl groups containing non-acid substituents such as alkoxy-aryl, aryloxy-aryl, nitro-aryl, chlor-aryl, dialkylamino-aryl, acylamido-aryl groups. The term aryl is therefore to be understood as including such substitued aryl groups unless it is specifically limited to aryl hydrocarbon groups, but as excluding cyclic groups which are not aromatic in character such as cycloaliphatic groups.

These compounds are readily prepared from the corresponding diarylamines by reacting the diarylamine with metallic sodium or potassium to form the alkali metal compound of the diarylamine, then adding carbon disulphide which reacts therewith and forms the alkali metal salt of the diaryl dithiocarbamic acid. This salt is then oxidized in water or alcohol solution with iodine or other suitable oxidizing agent to form the tetra-aryl thiuram disulphide, which in turn can be converted to the monosulphide if desired by heating with an alkali metal cyanide. The trisulphide and tetrasulphide are prepared by treating the alkali metal salt of the diaryl dithiocarbamic acid with sulphur dichloride and sulphur monochloride respectively.

These accelerators may be used over an extraordinarily wide range of conditions, for high- temperature or low-temperature cures, with high or low proportions of sulphur, or on occasion even without any free sulphur, and in any type of rubber composition from so-called "pure gum" to the most heavily reenforced tread stocks. The disulphides are generally preferred because of their ease of preparation, high activity, versatility and general freedom from objectionable properties. The monosulphides are quite similar in properties. The trisulphides and tetrasulphides are more active, especially at low temperatures, and are capable of giving good cures in the absence of free sulphur.

It is to be understood that the specific examples of the use of the compound diphenyl di-beta-naphthyl thiuram disulphide which follow are merely illustrative; that other compounds of the class hereinabove defined may be substituted with like results, and that they may be employed in rubber compositions of any desired character. This specific compound is a yellow powder with a melting point of 217° C. and is believed to have the following structural formula:

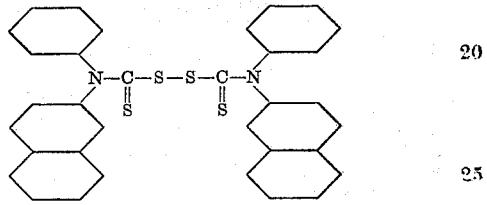

A rubber composition is prepared by mixing 100 parts by weight of rubber, 1 part of stearic acid, 5 parts of zinc oxide, 3.5 parts of sulphur, and 0.5 parts of diphenyl di-beta-naphthyl thiuram disulphide. This composition shows no signs of vulcanization after 30 minutes at 240° F., but is completely vulcanized and exhibits a tensile strength of 4800 pounds per square inch and an ultimate elongation of 750% after only 60 minutes at the same temperature. This delayed action of the accelerator is characteristic of the accelerators of this invention, and particularly of the tetra-aryl thiuram disulphides, and is of enormous practical significance since it permits vulcanization at low temperatures without fear of prevulcanization during the normal processing operations such as mixing, milling, calendering, extruding, etc.

Another rubber composition suitable for use as an automobile tire tread is prepared by mixing 100 parts by weight of rubber, 40 parts of carbon black, 2 parts of stearic acid, 2 parts of a fatty oil, 5 parts of zinc oxide, 1 part of phenyl beta-naphthylamine, 2 parts of sulphur and 0.5 parts of diphenyl di-beta-naphthyl thiuram disulphide. This composition shows the typical delayed action referred to above. It is practically unvulcanized after 15 minutes at 275° F., showing a tensile strength of only 480 pounds per square inch, yet is fully vulcanized and has a tensile strength of over 4000 pounds after only 30 minutes at the same temperature. Furthermore, the tensile strength remains unchanged after as much as 120 minutes heating at full vulcanizing temperature. This remarkably long curing range makes it possible to vulcanize even very thick tires completely through without danger of overcuring the surface, and without the necessity of adjusting the composition of the rubber on the inside of the tire to compensate for the time which is required to bring it up to full vulcanizing temperature.

The accelerators of this invention may be used in conjunction with other accelerators if desired. Nitrogenous bases in general activate the accelerator and permit vulcanization at lower temperatures. For example, 100 parts by weight of rubber are mixed with 5 parts of zinc oxide, 0.5 parts of sulphur, 3 parts of diphenyl di-beta-naphthyl thiuram disulphide and 0.5 parts of polybutylidene aniline. This composition vulcanizes in 60 minutes at 220° F. and may consequently be used in the so-called hot water cure. It likewise has an extraordinarily wide curing range, both in time and temperature, excellent products with a tensile strength of 3400 to 3700 pounds per square inch and ultimate elongation of 780 to 870% being obtainable at the low temperature just set forth and at any time between 5 and 60 minutes at 237° F. as well as at intermediate temperatures. Although this composition contains no anti-oxidant, it is unusually resistant to deterioration. It suffers practically no diminution in strength after as much as 4 days in a bomb containing oxygen at a pressure of 300 pounds per square inch and a temperature of 70° C. (158° F.), a treatment which completely destroys ordinary rubber compositions after 2 or 3 days.

The accelerators of this invention may advantageously be used in as low a proportion as 0.1% of the rubber in the composition, in which case 3 or 4% of sulphur is generally required, or as high as 5%, with a much reduced quantity of sulphur. Their maximum activity is exhibited only in the presence of a suitable inorganic base such as zinc oxide or magnesia, and with the addition of a nitrogenous base such as an aliphatic amine, a primary aromatic mono or diamine, an aldehyde-amine, a heterocyclic base, or even an amide or amidine such as urea, thiocarbanilide, the substituted guanidines, and the like, but they may also be used in the absence of either or both of these types of adjuvants, and under some conditions even in the absence of free sulphur. It is accordingly to be understood that the invention is not to be limited except as may be required by the prior art and as set forth in the appended claims.

I claim:

1. The process of vulcanizing rubber which comprises heating rubber in the presence of a tetra-aryl substituted thiuram sulphide.

2. The process of vulcanizing rubber which comprises heating rubber in the presence of a tetra-aryl hydrocarbon substituted thiuram sulphide.

3. The process of vulcanizing rubber which comprises heating rubber in the presence of sulphur and a tetra-aryl substituted thiuram disulphide.

4. The process of vulcanizing rubber which comprises heating rubber in the presence of a tetra-aryl substituted thiuram sulphide containing two different aryl groups.

5. The process of vulcanizing rubber which comprises heating rubber in the presence of sulphur and a tetra-aryl hydrocarbon substituted thiuram disulphide containing two different aryl groups.

6. The process of vulcanizing rubber which comprises heating rubber in the presence of a diaryl dinaphthyl thiuram sulphide.

7. The process of vulcanizing rubber which comprises heating rubber in the presence of sulphur and a di (aryl hydrocarbon) dinaphthyl thiuram disulphide.

8. The process of vulcanizing rubber which comprises heating rubber in the presence of a diphenyl di-beta-naphthyl thiuram sulphide.

9. The process of vulcanizing rubber which comprises heating rubber in the presence of sulphur and diphenyl di-beta-naphthyl thiuram disulphide.

10. The process of vulcanizing rubber which comprises heating rubber in the presence of sulphur, zinc oxide and diphenyl di-beta-naphthyl thiuram disulphide.

11. A vulcanized rubber composition prepared by heating rubber in the presence of a tetra-aryl substituted thiuram sulphide.

12. A vulcanized rubber composition prepared by heating rubber in the presence of a tetra-aryl hydrocarbon substituted thiuram sulphide.

13. A vulcanized rubber composition prepared by heating rubber in the presence of sulphur and a tetra-aryl substituted thiuram disulphide.

14. A vulcanized rubber composition prepared by heating rubber in the presence of a tetra-aryl substituted thiuram sulphide containing two different aryl groups.

15. A vulcanized rubber composition prepared by heating rubber in the presence of sulphur and a tetra-aryl hydrocarbon substituted thiuram disulphide containing two different aryl groups.

16. A vulcanized rubber composition prepared by heating rubber in the presence of a diaryl dinaphthyl thiuram sulphide.

17. A vulcanized rubber composition prepared by heating rubber in the presence of sulphur and a di (aryl hydrocarbon) dinaphthyl thiuram disulphide.

18. A vulcanized rubber composition prepared by heating rubber in the presence of a diphenyl di-beta-naphthyl thiuram sulphide.

19. A vulcanized rubber composition prepared by heating rubber in the presence of sulphur and diphenyl di-beta-naphthyl thiuram disulphide.

20. A vulcanized rubber composition prepared by heating rubber in the presence of sulphur, zinc oxide and diphenyl di-beta-naphthyl thiuram disulphide.

WALDO L. SEMON.